3,480,779
RADIANT ENERGY TARGET ACQUISITION AND TRACKING LOGIC SYSTEM
Ross L. Hand, Jr., Sun Valley, Calif., assignor to Lockheed Aircraft Corporation, Burbank, Calif.
Filed Dec. 27, 1965, Ser. No. 516,650
Int. Cl. G01j 1/20
U.S. Cl. 250—203          10 Claims

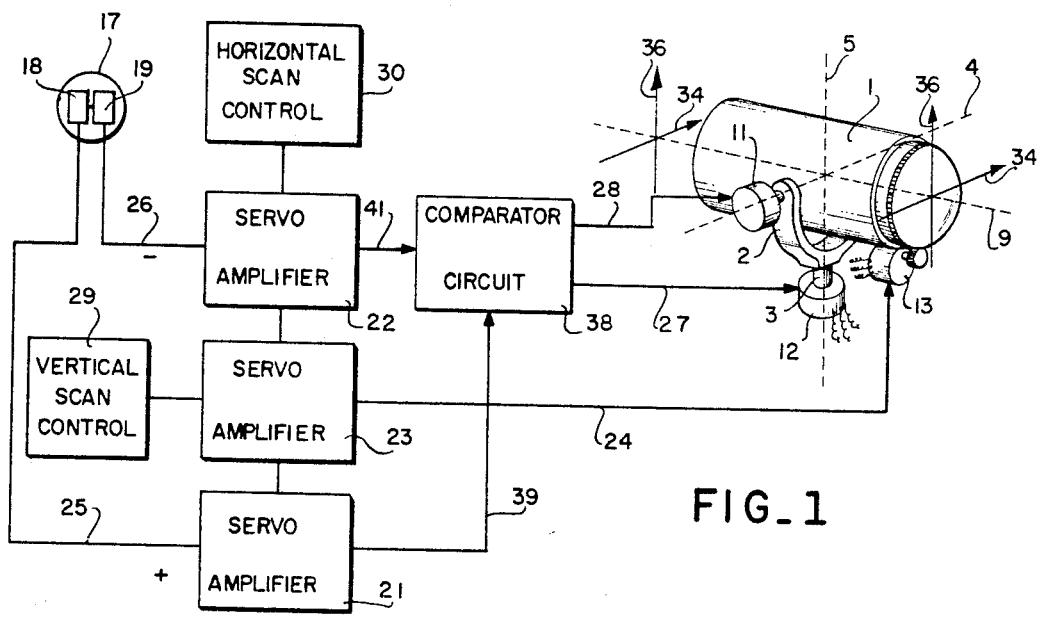
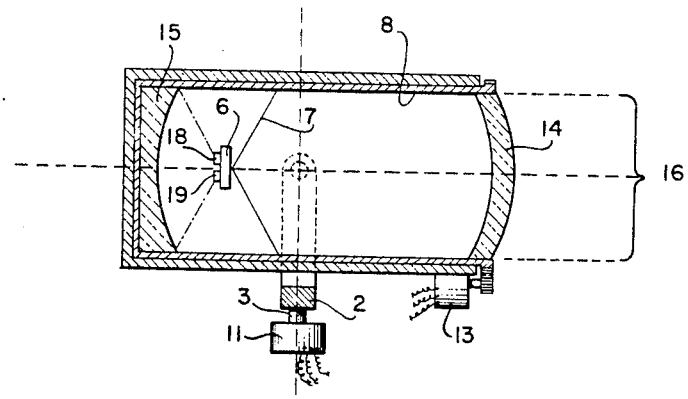
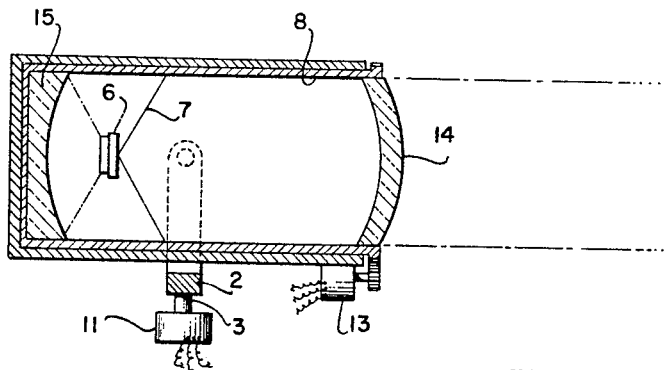
INVENTOR.
ROSS L. HAND, JR.

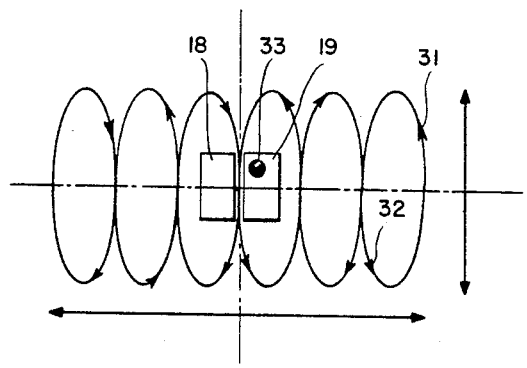
FIG_4
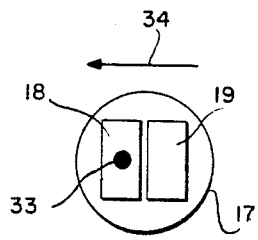
FIG_5a
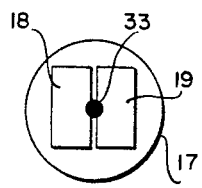
FIG_5b
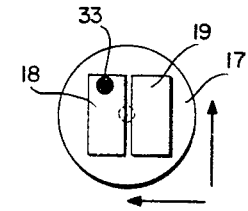
FIG_5e
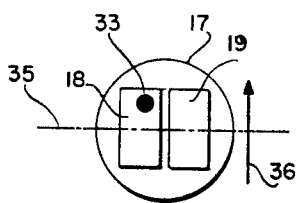
FIG_5c
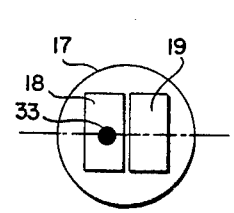
FIG_5d
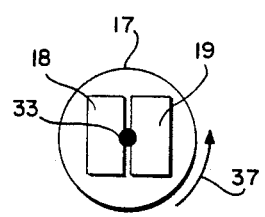
FIG_5f United States Patent Office 3,480,779
Patented Nov. 25, 1969

ABSTRACT OF THE DISCLOSURE

An optical scanning system is described which employs a single pair of side-by-side radiation detectors to initially acquire the image of moving emissive target and thereafter track the target. In its acquisition mode, the device continuously moves the pair of detectors in an oscillatory path along two orthogonal degrees of freedom (e.g., pitch and yaw axes). Acquiring the image of the target on either of the two detectors will stop the oscillation in one of the initial two degrees of freedom and automatically commence movement of the detectors in a third degree of freedom (e.g., roll axis) to the extent required to maintain the target image centered between them.

---

This invention relates to a novel method for tracking an emissive target and to novel and improved apparatus therefor, and more particularly to a simple target tracking logic system which combines both target acquisition and target tracking functions, and which requires but two radiant energy detectors.

Numerous tracking methods and devices have been employed heretofore, for searching, acquiring, and thereafter tracking an emissive target such a target emitting infrared energy. However, these devices are generally characterized by the use of multiple-cell detector arrays, and complex electromechanical scanning devices. While such apparatus is useful for certain ground based applications or in large aircraft, size and complexity generally precludes use of such apparatus in missile guidance systems or other applications in which simplicity, reliability, and small size are primary criteria. The present invention relates to an infrared tracking method employing novel logic and apparatus which overcomes the above enumerated disadvantages of prior apparatus and techniques employed to obtain generally similar results. While the invention will be discussed hereinafter in terms of its application to the acquisition and tracking of an infrared emissive target, it should be understood that its operation is not limited to the infrared portion of the radiant energy spectrum.

The problems imposed by initially acquiring a target and thereafter tracking the target have been such as to dictate the use of separate systems for these separate functions. Combined systems of the prior art generally require a complex scanning system which is inefficient in their time utilization and therefore are not compatible with infrared detectors having longer time constants. This shortcoming of prior devices is overcome by means of the present invention, and thus permits a range of detector materials to be used, having various time constants.

In the apparatus employed in the ultilization of the novel logic of the present invention, only two infrared detector cells are used. Novel signal circuits, responsive to the output of the pair of cells, controls the scanning of the field of interest and automatically converts from a search-acquisition mode to a tracking mode upon acquiring a target within its field and provides output steering error signals to null the tracking error or otherwise control external utilization equipment. The conversion from acquisition to tracking mode is accomplished by stopping one of two orthogonal scan motions upon target acquisition. In the tracking mode the field is limited (one scan is stopped) and thus the data rate (frequency of the target pulses) is acceptable to the system without high scanning rates which would exceed the allowable detector cell time constant. The apparatus may be used to generate both vertical, horizontal, and roll error signals of a form which are suitable for direct input to a missile guidance system. Other applications will become apparent to those skilled in the art from the ensuing description.

It is therefore a principal object of the invention to provide a novel and improved infrared emissive target tracking logic system.

It is an object of the invention to provide a novel and improved radiant energy target acquisition and tracking system employing only a single pair of emissive energy detectors.

Another object of the invention is to provide a radiant energy tracking device employing only two detector cells, and which is capable of providing horizontal, vertical, and roll output error signals.

Still another object of the invention is to provide a novel and improved radiant energy emissive acquisition and tracking system which is simple, reliable, and of small size.

It is yet another object of the invention to provide novel improved target tracking logic suitable for use in the guidance system of a missile.

A general object of the invention is to provide a novel and improved target tracking apparatus which overcomes disadvantages of previous means and methods heretofore intended to accomplish generally similar purposes.

Many other advantages, features, and additional objects of the present invention will become manifest to those versed in the art upon making reference to the detailed description and the accompanying sheets of drawings in which the preferred structural embodiment, incorporating the principles of the present invention, is shown by way of illustrative example. In the figures:

FIGURE 1 is a schematic diagram illustrating an embodiment of the apparatus of the invention.

FIGURE 2 is a plan section view of the scanning head portion of the apparatus of FIGURE 1.

FIGURE 3 is an elevation section view of the scanning head portion of the apparatus, of FIGURE 1.

FIGURE 4 is a diagram illustrating the scanning motion of the apparatus.

FIGURES 5a through 5f are scanning diagrams of assistance in the exposition of the invention.

The invention resides partly in the physical and electrical structures and in the relationship embodied in the detector cell assembly, the signal processing circuits, and the scanning components of the system herein specifically illustrated, but also embraces the novel logic inherent in the system and the concept of the system itself, considered as an integrated whole, and independently of the structural details of its several parts.

Referring now to FIGURES 1–3, there is shown a schematic diagram of a typical embodiment of the apparatus of the invention. Inasmuch as each of the functional units represented by a rectangle in the schematic diagram of FIGURE 1, may be any one of the numerous devices for each respective function well know in the art, it is deemed unnecessary to show circuit details. To facilitate exposition of the invention, its use as an infrared (IR) target acquisition and tracking device will be described.

The scanning head portion of the apparatus comprises a cylindrical housing 1 which contains and supports the collecting optics and the dual-detector assembly. Housing 1 is supported on yoke 2 and trunnion 3 permitting it to be moved about the pitch axis 4 and the yaw axis 5. A detector assembly 6 is supported by spider 7 which in turn is mounted on sleeve 8, as can best be seen in FIGURE 2. Sleeve 8 is slidably supported within housing 1 so that it may be rotated about the roll axis 9. Alternatively, the entire apparatus may be made rotatable about the roll axis as would be the case wherein sleeve 8 is fixedly mounted to the airframe of a missile and the roll axis is along the entire missile. Bi-directional motion may be imparted to the scanning head about the pitch axis by means of servo motor 11. Similarly, motion may be imparted about the yaw axis 5 by means of servo motor 12. Motion may be imparted about the roll axis 9 by means of servo motor 13, or by suitably steering the vehicle carrying the apparatus. These three degrees of movement will permit the scanning head to be nulled onto a target, as will appear.

Any suitable collecting optics may be employed and may for example comprise a catadioptric objective system comprising meniscus lens 14 and concave spherical mirror 15. The collecting optics system focuses incoming rays 16 from the field of view onto the detector assembly 6.

The detector assembly comprises a suitable supporting member 17 which may, if desired, be cooled, and a pair of detector cells 18 and 19. The detector cells may comprise flakes of intermetallic semiconductor material which are responsive to radiant energy impinging thereon to provide an electrical output signal. The selection of a specific material for the detector flakes is dependent upon a number of factors including the wavelength of the target of interest, the allowable time constant of the system, and operating temperature. The detectors 18 and 19 are positioned closely adjacent each other, as shown in FIGURES 4–5f, so as to have a narrow linear gap therebetween. The two juxtaposed infrared detectors have their electrical outputs connected so that the outputs appear in separate circuits and are considered positive for detector 18 and negative for detector 19. The positive output of detector 18 is supplied to servo amplifier 21. The negative output from cell 19 is supplied to servo amplifier 22. The signals developed by amplifiers 21 and 22 are also supplied to servo amplifier 23 whereby a roll output signal will appear on line 24 in response to certain phase relationships between the signals on lines 25 and 26, as will be discussed more fully hereinafter. The output of servo amplifier 21 is supplied via line 39 to comparator circuit 38 where it is compared with the output of servo amplifier 22 obtained via line 41, to generate a yaw control signal which is supplied on line 27 to the yaw axis servo motor 12. Similarly, the output from servo amplifiers 21 and 22 are analyzed in comparator circuit 38 to generate a pitch control signal which is supplied on line 28 to the pitch servo motor 11. A vertical scan control circuit 29 is connected to servo amplifier 23. A horizontal scan control circuit 30 is connected to servo amplifier 22. These control circuits (29 and 30) first drive the corresponding servo motors (11 and 12, respectively) in one direction and then the other, thus cyclically traversing the field of view. This cyclical scan will be described hereinafter in connection with FIGURE 4.

The detector cells 18 and 19 receive energy from infrared targets of interest and are scanned over a field of the required size. The detector cells 18 and 19 generate electrical output signals in response to radiation falling within their field of view. The collecting optics may be modified from those shown in FIGURES 1–3 and may employ aperture stops, windows, mirrors, lenses, prisms, or combinations of these optical elements as required to collect and direct the energy from the emissive target onto the pair of detectors 18 and 19. The IR radiation reaches the sensitive surface of the detectors 18 and 19 within a wave band determined by the temperature and the nature of the source and background, modified by the intervening atmosphere or environment in the optical system between the source and the detectors. Cooling the detector cells 18 and 19 while increasing the longer wavelength spectral response, also increases the time constant.

The apparatus responds electromechanically to an "off center" position of the image of the target being tracked to move the scanning head to null the signal. The movement of the target image into a null position is under the control of error signals which control the positioning servo motors 11–13 and which may be used for guidance. The error signals are a function of the position of the target image with respect to the two detectors 18 and 19. These signals are amplified to control the orienting servo motors for moving the scanning head which will center the target image. The scanning head can be made to automatically orient itself to the desired target after being approximately aimed by dead reckoning. As soon as the target appears in the field of view, the apparatus will automatically center on the image.

As mentioned hereinabove, horizontal scan control 29 and vertical scan control 30 generate signals which cause the scanning head to cyclically sweep back and forth across the field of interest. This scanning operation occurs during the acquisition mode of operation and commences from a dead reckoning position. The acquisition scan cycle is illustrated in FIGURE 4. The simultaneous application of a vertical scan signal from vertical scan control 30 and a horizontal scan signal from scan control 28 will result in the apparatus initially following the path indicated by the arrow 31 and at the completion of the first half-cycle of the horizontal sweep, will reverse and follow in the direction of arrow 32. Thus, for every six cycles of the vertical scan there is one cycle of the horizontal scan. The ratios of the horizontal and vertical scan repetition rates as determined by controls 29 and 30, may be selected to correspond to a field area of the required size and shape. When a target image, as indicated at 33, falls upon either detector 18 or 19, the horizontal scan 29 is stopped but the vertical scan 30 continues. This will momentarily leave the image of the target 33 within the area of detector assembly 6. This completes the acquisition mode of operation and initiates the commencement of the tracking mode. The response of the system during the tracking mode will now be described.

The horizontal scan motion under the control of 30 determines the horizontal boresight centering of the scanning head by equal energy input on cells 18 and 19 indicating zero horizontal error. Vertical scan is based upon time of target pulses appearance upon the two detector cells (18 and 19) relative to the centerline pulse. A rotational angle is also produced by lack of coincidence of the pulse appearance on cells 18 and 19. As mentioned previously, when a target is intercepted by either cell 18 or 19 the horizontal scan is stopped but the vertical scan continues. If cell 18 is being irradiated, a steering error is generated to bring the target towards cell 19. This condition is illustrated in FIGURE 5a in which target image 33 is irradiating cell 18; motion will then be in the direction of arrow 34. This will result in the target image 33 moving to the position shown in FIGURE 5b. When each cell is irradiated equally, the steering error is zero (i.e., the scanning head is centered). The action is in the opposite direction when the target first falls on cell 19. When target pulses are generated above the zero centerline 35, as shown in FIGURE 5c, the device is steered upward in the direction of arrow 36 and when the pulse is on the zero centerline 35, as shown in FIGURE 5d, the vertical error is zero. Both horizontal and vertical error signals will drive the device along a vector as shown in FIGURE 5e.

As will be apparent to those versed in the art, the scanning apparatus of FIGURE 1 may be modified to permit the apparatus of the invention to be used for missile guidance. In such as application, means for nutating the detector assembly 6 is employed during the acquisition mode and the steering control of the missile is used to null the error signals during the tracking mode.

The manner in which a roll error signal is generated is best understood by considering the utilization of the scanning apparatus in the guidance system of a missile. In most practical missile guidance applications the detector cells 18 and 19 would be arranged to track up and down, rather than right and left (transversely) as indicated in FIGURES 4–5f. This would require a 90° rotation of the apparatus shown, and is preferred for such applications because the fins or control surfaces which steer the missile are usually oriented normal to, and transversely to the target. This is particularly true if the missile is to be directed to a target ship and the point of impact is to be controlled not only to strike the ship, but to strike at or slightly below its waterline.

The roll error signal becomes operative when the missile has approached its target close enough so that the target image is of sufficient size to have a definite elongate shape. For example, when the missile closely approaches a ship, the thermal contrast between the ship and the water will cause the image to appear as a line spanning the two detector cells 18 and 19. Under such conditions the "up" scan (or scan in the direction of arrow 34 shown in FIGURE 5a) will produce a pulse ahead of cell 18. On the "down" scan, a pulse will be generated from cell 18 ahead of the pulse generated by cell 19. From this, a logical output is derived comparing cell 18 with cell 19 in terms of time of occurrence, and relates the result to the vertical scan direction. The resulting logic signal will cause the entire missile to roll in the directon of arrow 37 (shown in FIGURE 5f) until the scan direction is normal to the side of the target ship (viz the major axis of the target's line image).

Other modifications and applications of the invention will be apparent to those versed in the art.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention; therefore, it is intended that the invention be limited only as indicated by the scope of the following claims.

What is claimed is:

1. Radiant energy detection apparatus comprising:
    first and second juxtaposed coplanar radiant energy detecting elements;
    scanning means movably mounting said first and second detecting elements for movement through three degrees of freedom; and
    control means connected to said scanning means for initially oscillating said detecting elements through two degrees of freedom until radiant energy is received by one of said detecting elements and thereafter terminating oscillation through one of said two degrees of freedom and commencing movement through the remaining degree of freedom in a direction to maintain said radiant energy on both of said detecting elements.

2. Radiant energy tracking apparatus comprising:
    a pair of coplanar detecting elements, responsive to radiant energy to produce an output, in juxtaposition and having a narrow linear interstice therebetween·
    scanning means for causing said pair of detecting elements to oscillate back and forth along a first path at a first rate, and back and forth along a second orthogonal path at a second rate and thereby cover a given field of view;
    means for interrupting the oscillation of said scanning means along said first path whenever an output is obtained from either one of said detecting elements; and
    means responsive to the outputs from said detecting means to steer said scanning means along said first and second paths until said radiant energy is received simultaneously by said two detecting elements.

3. Radiant energy tracking apparatus as defined in claim 2 including:
    means for rotating said pair of detecting elements about an axis passing through said interstice during the time when radiant energy is being received until said radiant energy is received by said pair of detecting means in a given sequence.

4. Radiant energy tracking apparatus as defined in claim 3 wherein said rotational control means includes:
    motor means for turning said pair of detecting elements about an axis normal to the plane thereof.

5. Radiant energy tracking apparatus comprising:
    a pair of juxtaposed detecting elements responsive to received radiant energy to generate electrical output signals;
    collecting optic means for receiving and directing radiant energy onto said pair of detecting elements;
    scanning means connected to said collecting optic means for cyclically imparting two orthogonal scan motions to said optic means and thereby cause said detecting elements to be exposed to a given field of view;
    scan control means connected to said scanning means for terminating one of said two orthogonal scan motions whenever radiant energy is detected by one of said detecting elements; and
    steering means responsive to said output signals and operative during the time when said one scan motion has been terminated by said scanning control means for moving said optic means along the path of the other of said scan motions until said radiant energy is detected by first one and then the other of said detecting elements.

6. Radiant energy tracking apparatus as defined in claim 5 including:
    rotational control means connected to said detecting means and responsive to the sequence in which said radiant energy is received by said detecting elements to cause the detecting element to be rotated about the axis of said collecting optic means until said radiant energy is detected by said detecting means in a given sequence under the control of said steering means.

7. Radiant energy tracking apparatus as defined in claim 5 wherein said pair of detecting elements are coplanar and are spaced apart along a centerline which is perpendicular to said one scan motion.

8. Radiant energy tracking apparatus as defined in claim 5 including:
    mounting means for supporting said optic means and said detecting elements for receiving said radiant energy along a common axis.

9. Radiant energy tracking apparatus comprising:
    first and second radiant energy detecting elements located in the same plane and spaced apart along a narrow linear interstice;
    horizontal scanning means connected to said first and second detecting elements for cyclically sweeping said elements back and forth across a given horizontal field of view;
    vertical scanning means connected to said first and second detecting elements for cyclically sweeping said elements up and down across a given vertical field of view;
    scan control means connected to said horizontal scanning means and said vertical scanning means for simultaneous operation thereof until radiant energy is detected by either said first or second detecting element at which time sweeping motion of said horizontal scanning means is terminated; and steering means connected to said horizontal scanning means and to said vertical scanning means for positioning said first and second detecting elements whereby said radiant energy will fall upon said interstice throughout the sweep of said vertical scanning means.

10. Radiant energy tracking apparatus as defined in claim 9 including:

rotational control means responsive to the sequence in which said first and second detecting means receive said radiant energy to cause said vertical scanning to be rotated about an axis normal to said plane until said radiant energy falls along interstice.

References Cited

UNITED STATES PATENTS

| | | | |
|---|---|---|---|
| 2,921,757 | 1/1960 | Houle | 250—203 X |
| 2,952,779 | 9/1960 | Talley | 250—203 X |
| 3,041,011 | 6/1962 | Dhanes | 250—203 X |
| 3,133,355 | 5/1965 | Beach | 250—203 X |
| 3,194,949 | 7/1965 | Jasperson | 250—203 X |
| 3,323,757 | 6/1967 | Cole | 250—203 X |

JAMES W. LAWRENCE, Primary Examiner

C. R. CAMPBELL, Assistant Examiner

U.S. Cl. X.R.

250—208, 209, 210, 234